Figure 1:
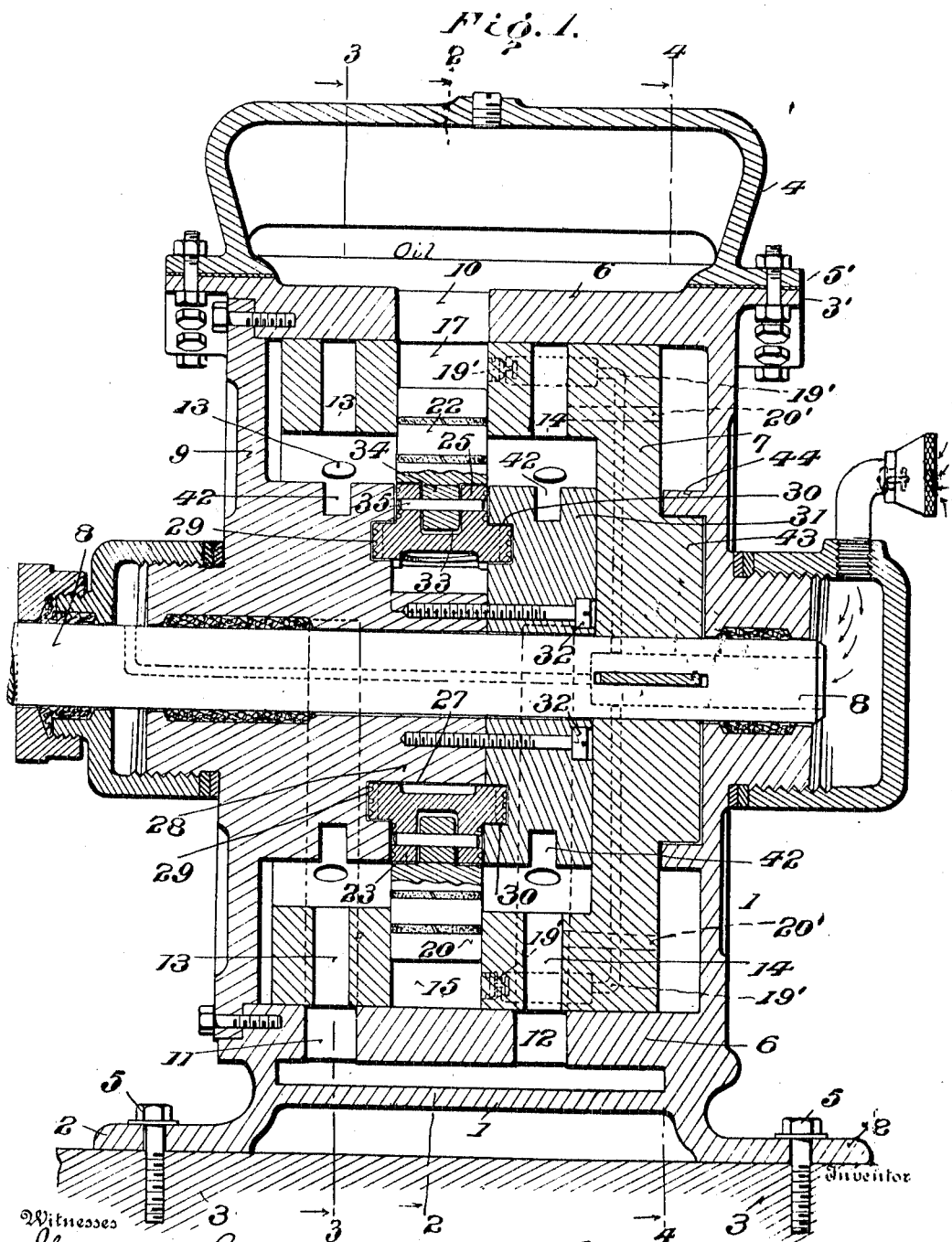

L. H. ROGERS.
ROTARY PUMP.
APPLICATION FILED OCT. 1, 1906.

1,090,235.

Patented Mar. 17, 1914.
8 SHEETS—SHEET 1.

Witnesses
Gustave R. Thompson
Frederick A. Holton

Inventor
By Lebbeus H. Rogers,
Mauro, Cameron, Lewis & Massie
Attorneys

L. H. ROGERS.
ROTARY PUMP.
APPLICATION FILED OCT. 1, 1906.

1,090,235.

Patented Mar. 17, 1914.
8 SHEETS—SHEET 3.

Witnesses
Gustave R. Thompson
Frederick G. Holton

Inventor
Lebbeus H. Rogers,
by
Mauro, Cameron,
Lewis & Massie
Attorneys

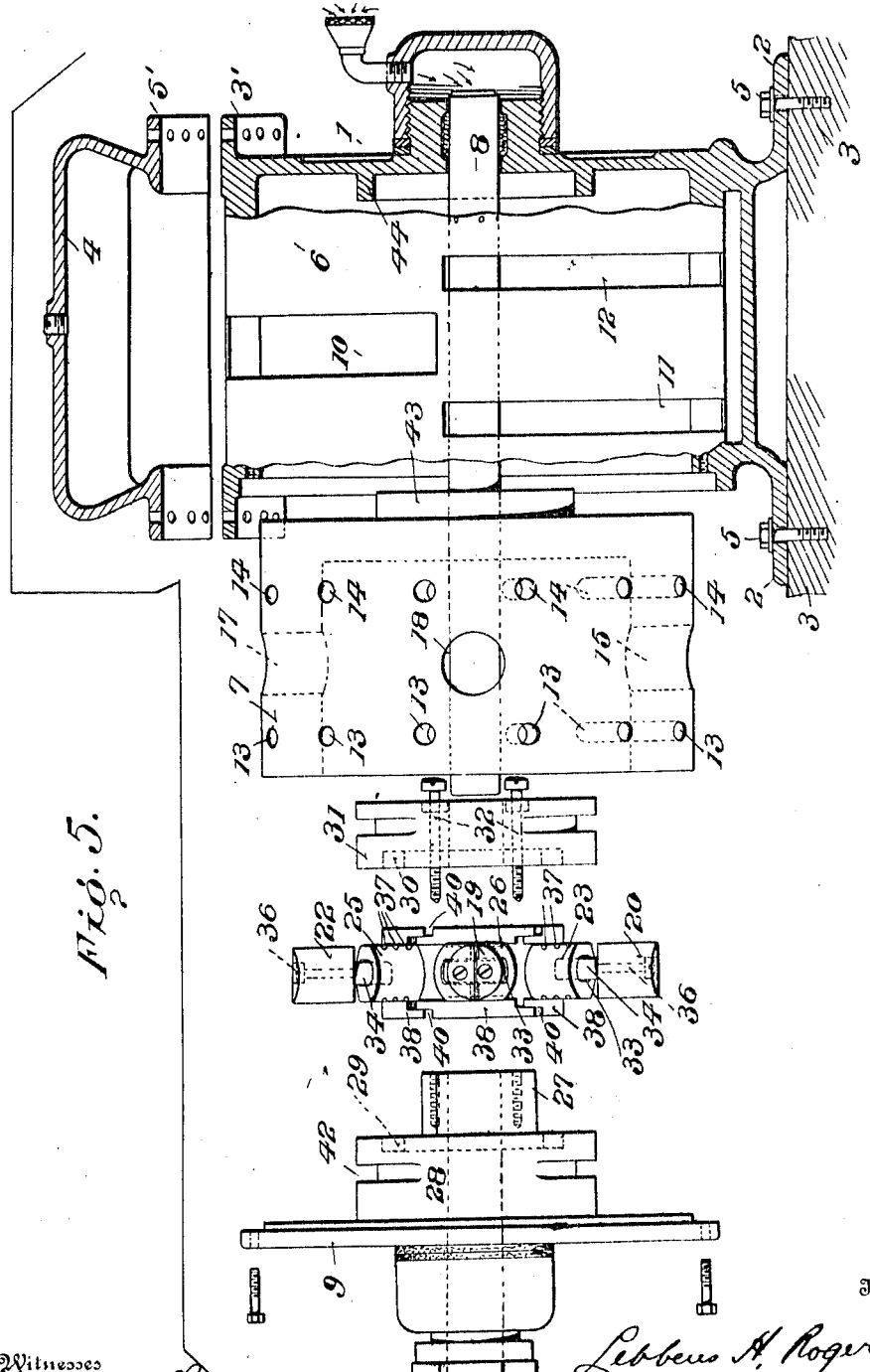

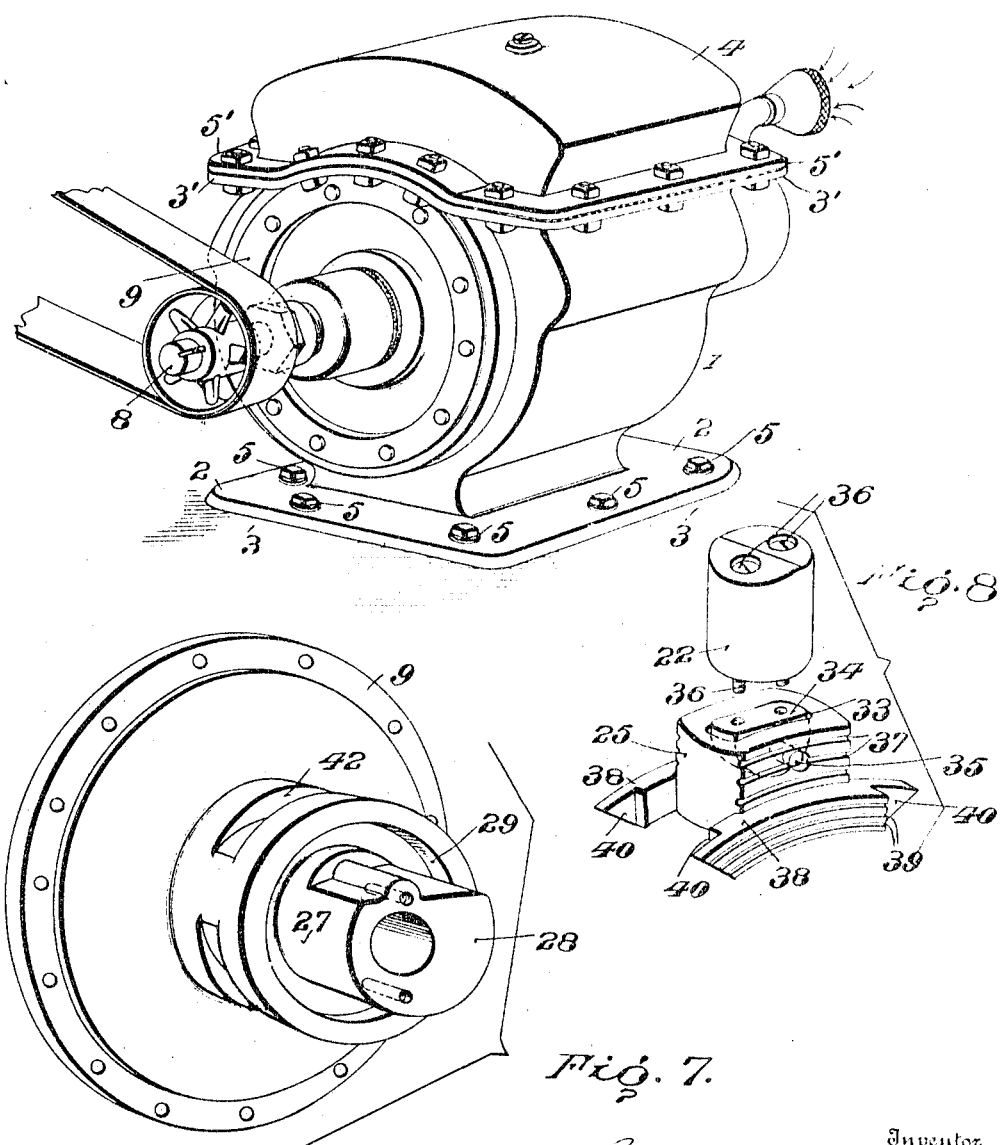

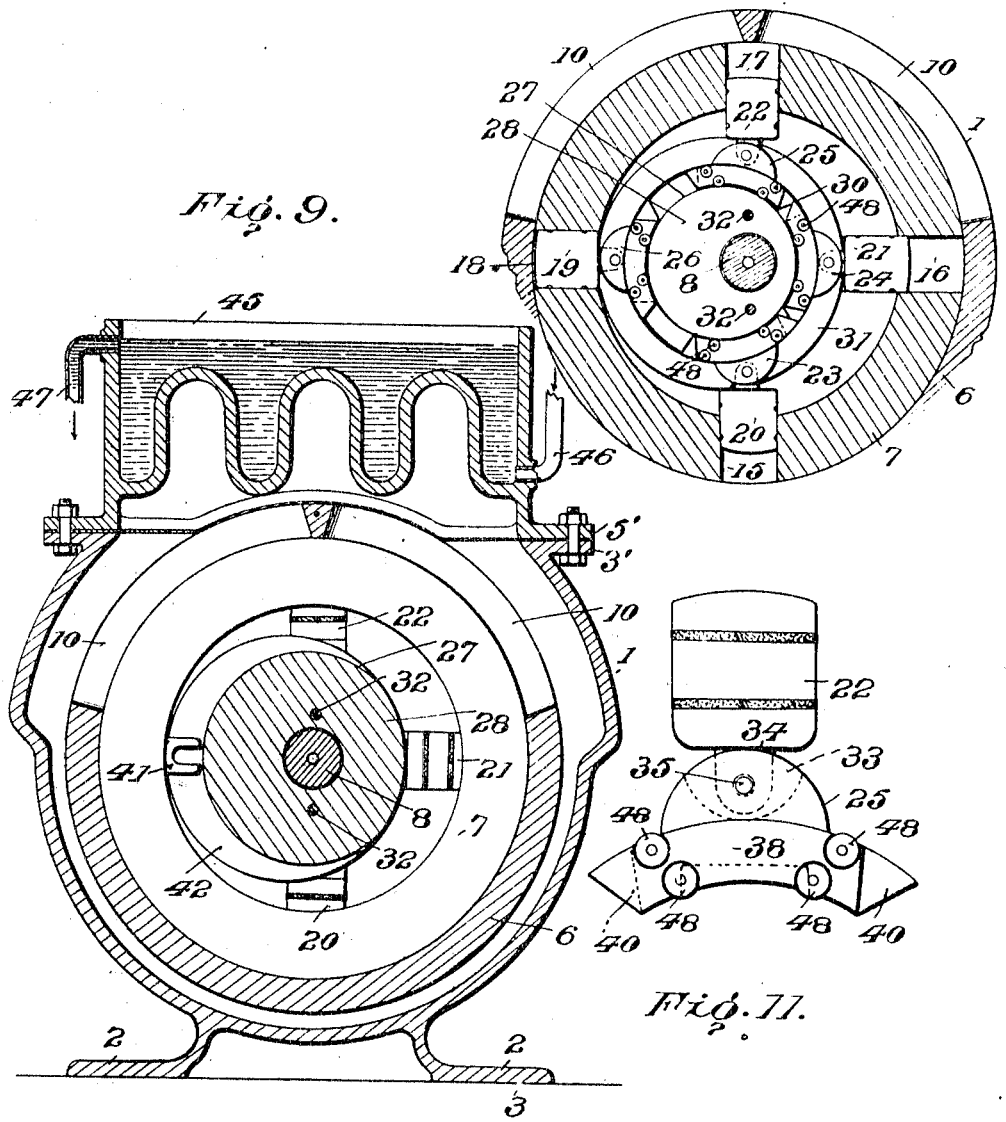

L. H. ROGERS.
ROTARY PUMP.
APPLICATION FILED OCT. 1, 1906.
1,090,235.
Patented Mar. 17, 1914.
8 SHEETS—SHEET 7.
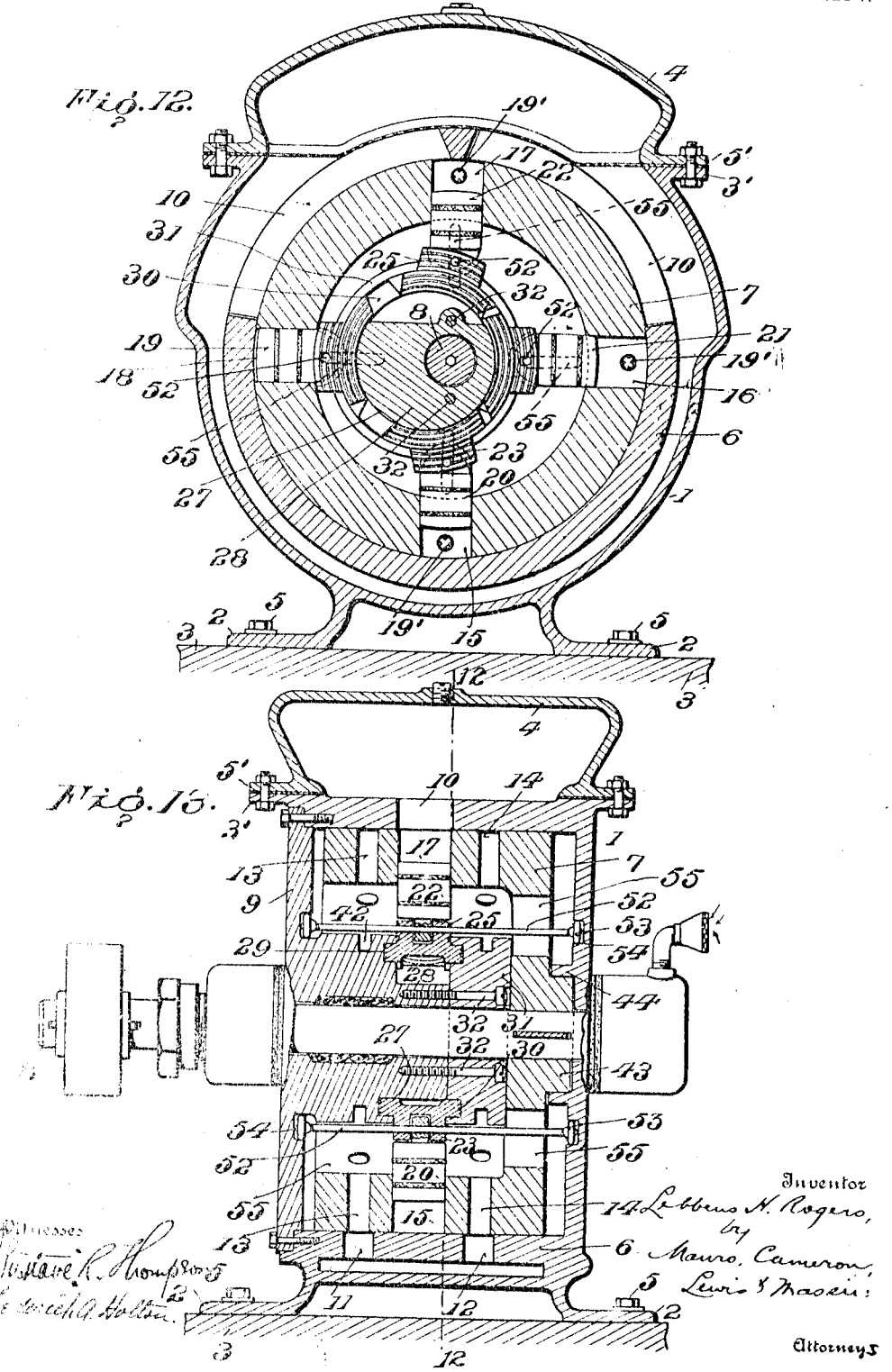

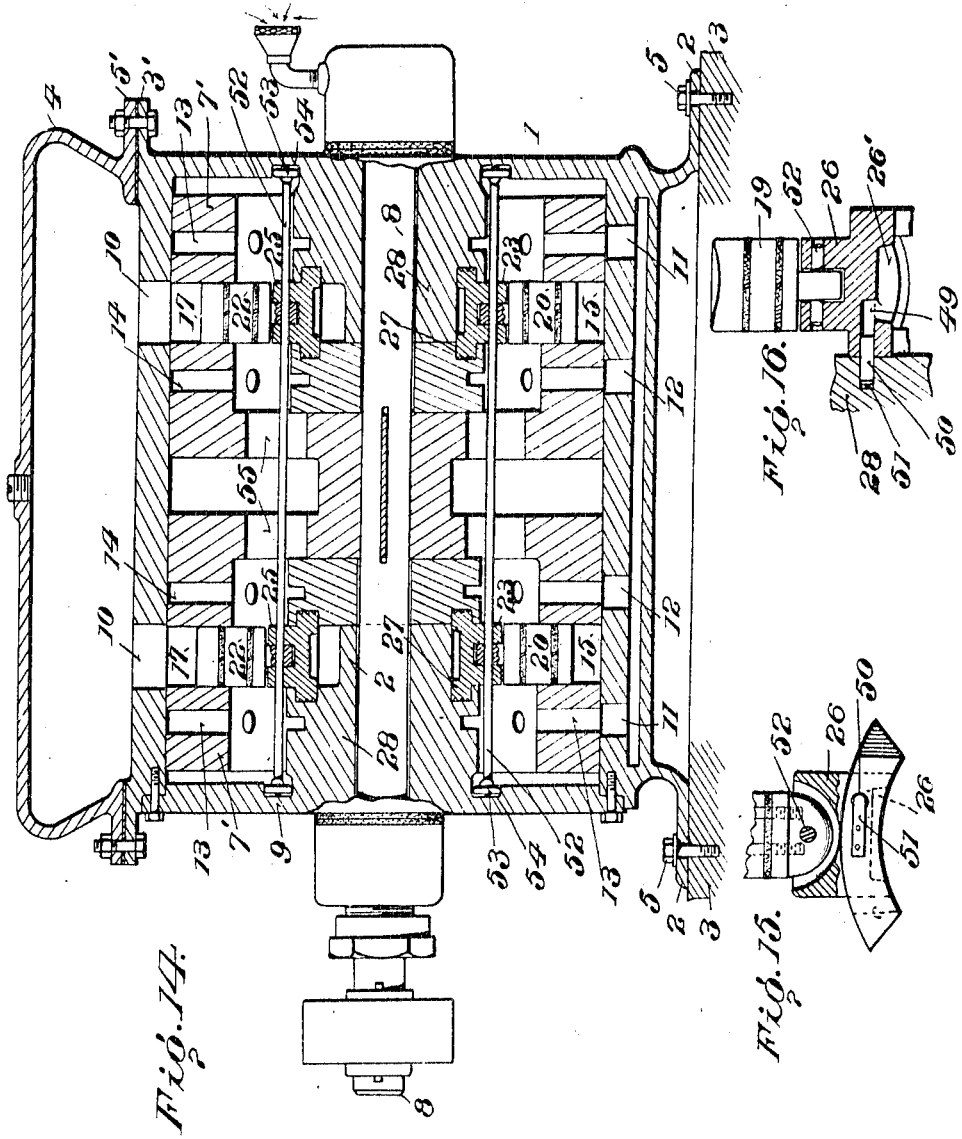

UNITED STATES PATENT OFFICE.

LEBBEUS H. ROGERS, OF NEW YORK, N. Y.

ROTARY PUMP.

1,090,235.  Specification of Letters Patent.  Patented Mar. 17, 1914.

Application filed October 1, 1906. Serial No. 337,008.

*To all whom it may concern:*

Be it known that I, LEBBEUS H. ROGERS, of New York, N. Y., have invented a new and useful Improvement in Rotary Pumps, which improvement is fully set forth in the following specification.

This invention relates to air and gas pumps, particularly to that class of pumps in which a piston is given both a rotary and rectilinear movement, and may be used for compressing or exhausting air or gases or for pumping fluids in general. In my U. S. applications Serial No. 299,968 filed Feb. 7, 1906; and Serial No. 309,001 filed March 20, 1906, and in my U. S. Patents No. 838,440, No. 838,458, and No. 838,459, each dated December 11th, 1906, I have shown compressors of this type in which oil or other suitable fluid under pressure is admitted to the rear of the pistons, which together with other features were designed to reduce friction in the operation of the compressor, to permit a less obstructed flow of oil or other liquid under pressure to the desired parts of the compressor, to more effectively balance pressures and to otherwise improve the construction and operation of the compressor.

The present invention embodies improvements upon the structures of the said applications and is designed to attain high pressures, say one hundred to one thousand pounds to the square inch, to eliminate friction along the cam path on the atmospheric side of the compressor, to economize power lost by overheating in narrow delivery passages, to substantially eliminate heat of compression within the piston channels, to effect compression of the air or gas while maintaining it during compression practically at its initial temperature, to more effectively balance pressures on the cam-operated pistons during their entire stroke whereby loss of power along the cam track is minimized and higher gage pressures attained in the reservoir with less expenditure of energy than heretofore attainable in compressors of this type.

With these principal objects in view, the invention consists of the improved features of construction hereinafter described and then pointed out in the claims.

While the invention is capable of receiving various mechanical expressions without departing from the principle thereof, the preferred embodiment thereof is shown for the purpose of illustration, in the accompanying drawings, in which—

Figure 2:
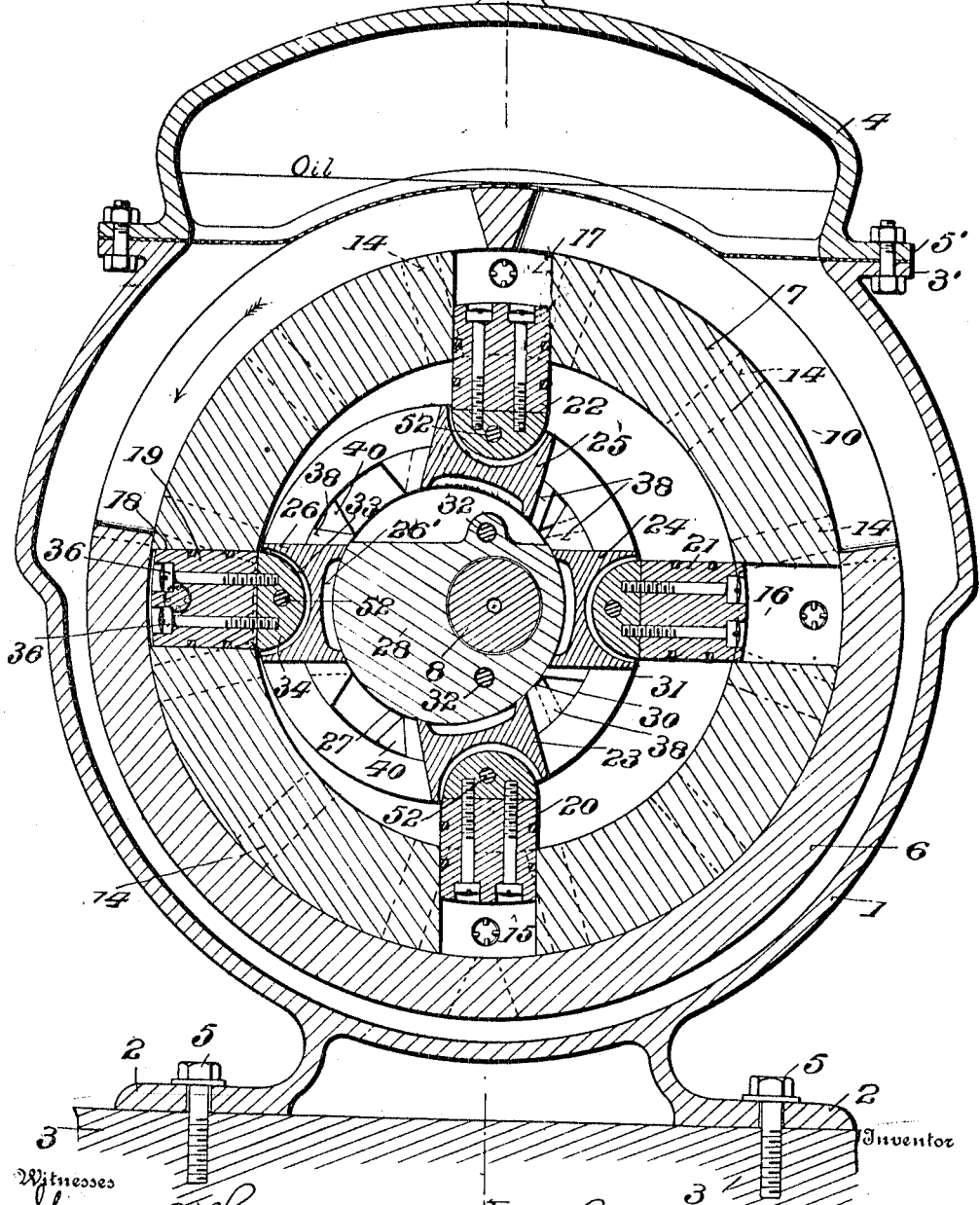
Figure 3:
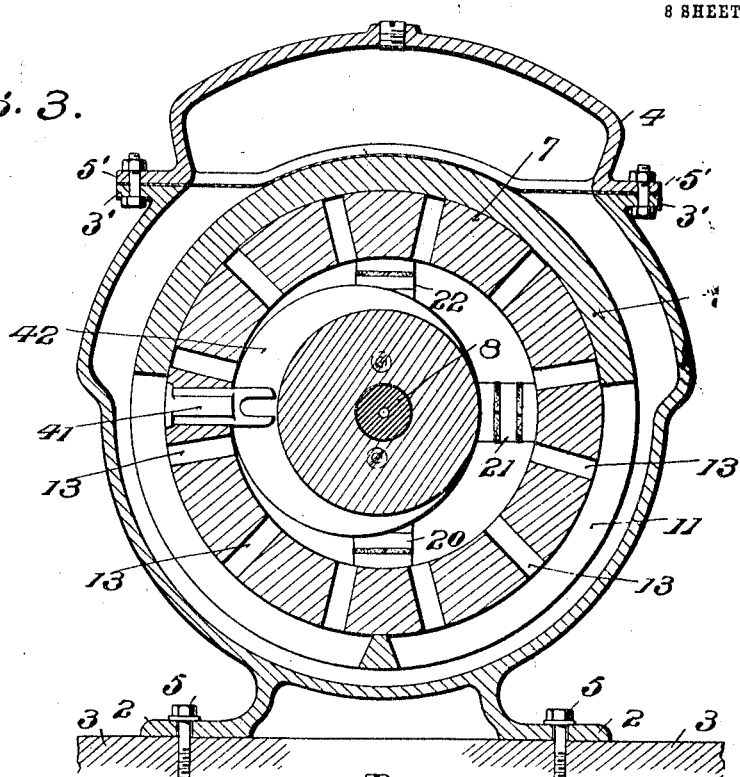
Figure 4:
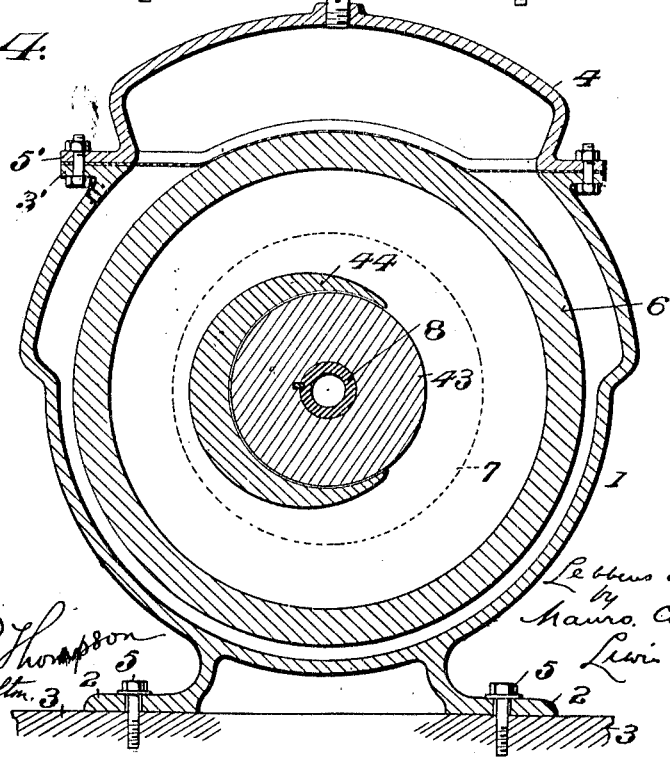

Figure 1 is a vertical longitudinal section taken on the line 1—1 of Fig. 2; Figs. 2, 3 and 4 are transverse sectional views taken on the lines 2—2, 3—3, and 4—4 of Fig. 1; Fig. 5 is a view partly in elevation and partly in section showing the parts of the pump separated, and Fig. 6 is a perspective view of the latter; Figs. 7 and 8 are details showing the cam arm and one of the pistons carrying cam slides; Fig. 9 illustrates means for cooling the gases compressed within the pump casing; Figs. 10 and 11 are detail views illustrating another form of cam slide; Fig. 12 is a transverse sectional view on the line 12—12 of Fig. 13, and Fig. 13 is a central longitudinal sectional view taken through Fig. 12 showing another embodiment of my invention; Fig. 14 illustrates in longitudinal vertical section a view of a duplicate pump similar in construction to that of Figs. 12 and 13; and Figs. 15 and 16 are details.

Referring to Figs. 1 and 2, the pump casing which is preferably of cast metal has an outer wall 1 the lower portion of which is cylindrical and is provided with means for attachment to a ceiling or floor, one such means being illustrated in the form of a flange 2 for attachment to a floor 3 by bolts 5. The upper portion of this outer casing is of somewhat larger diameter than the lower portion for the purpose of forming a space for liquid such as oil, and is preferably provided with a flange 3′ for seating a dome 4 having a similar flange, the two flanges being secured tightly together by bolts taking through a suitable packing ring in the usual manner. The inner wall 6 of the casing which acts as a pressure shield and cut-off, as explained later, is bored out to receive a piston-carrying drum 7 which is mounted on a shaft 8, preferably hollow, having bearings in the end walls of the casing. One or both of the end walls of the casing may be removable from the latter, but preferably only one, such as end wall 9, which is to support the cam arm hereafter described, is made separable, or the cam arm can form part of the integral end of the casing. Free communication between the space formed by the opposing walls 1 and 6 and the interior of the piston drum 7 is provided through slotted openings 10, 11 and 12 in inner wall 6, and through the two series of passages 13, 14 in the revoluble drum 7. As shown in Fig. 2, the passage 10 in wall 6 extends only around the upper half of the inner wall or shield, and passages 11 and 12 in wall 6 only occupy the lower half of the same, the combined area of the openings of the latter through wall 6 being about equal to that of passage 10.

Piston drum 7 which is keyed to shaft 8 is provided with a plurality of piston channels 15, 16, 17 and 18, radially disposed with reference to the axis of the drum. Air is admitted to these channels from the exterior of the drum by means of one or more air inlet conduits which may be arranged in various ways in relation to the drum, the one illustrated for the purpose consisting of valve-controlled passages 19' which communicate with an air inlet through shaft 8 shown in dotted lines, Fig. 1, and more fully described in my application Serial No. 309,001 above referred to. It is to be understood, however, that I do not limit myself to this particular arrangement for air admission to the piston channels, as air may be admitted, for example, through or to the peripheral wall of the drum. The oil under reservoir pressure which enters the drum through the wall 6 by way of passages above described, has access to the space between the end wall of the casing and the solid end wall of the drum by way of passages 20', 20', to thereby enable a counter pressure to be applied to the end wall of the drum in opposition to the lateral pressure exerted by the oil inside the drum. Instead of admitting oil to the interior of the drum by peripheral passages as shown, it may be admitted through other passages, which will permit communication between the interior of the drum and the space surrounding the same.

Within the piston channels 15, 16, 17 and 18 are pistons 19, 20, 21 and 22, which are caused to reciprocate therein by means of cam slides 23, 24, 25 and 26 to which they are pivotally connected, said slides gliding over a cam surface 27 (Figs. 2 and 7) formed on a cam arm 28, Fig. 1, which may be integral with or separable from the end wall of the casing. The center or axis of this cam surface is eccentric to that of the axis of the drum, and it is particularly to be noted that its surface is discontinuous, the bearing surface being on the air intake side of the piston drum or on the side opposite the delivery side of the piston channels and serves the double function of a cam and also of a pressure shield. The cam arm 28 is preferably provided with retaining side grooves 29 and 30, for giving to the cam slides 23 greater steadiness of movement, and also to guide the slides over the discontinuous portions of the cam surface at the top of the cam arm 28. One of these grooves 29 is made in the cam arm which is integral with the end wall 9, and the other, in a removable cap 31, secured to the end of the cam arm 28 by means of screws 32. The opposing concentric faces of each of these grooves 29 and 30 may also serve as pressure shields to the cam-slide wings to enable fluid pressure to be applied to one or both sides of the wings at any desired part of their path for the purpose of balancing fluid pressure on the piston, on the body or the cam-slide, or to oppose the force of inertia of the pistons as the latter are carried around by the drum 7.

The cam slides 23 above referred to may take on a variety of forms one of which, and the one preferred, is illustrated in Fig. 8, in which the body of the cam slide is provided with a recess 33 for receiving a rocking member 34 supported by a pivot 35. To member 34 is secured a piston 22, for example, by means of screws 36. Sunk in the sides of the cam slide may be grooves 37 the purpose of which is to reduce the frictional contact of the sides of the slide with the side faces in the cam arm 28. The body of the cam slide is preferably provided with side wings or flanges 38 also having grooves 39 for the purpose of further reducing frictional contact. These wings extend beyond the cam body 23 both in front and to the rear, giving to the cam slide a greater steadiness of movement as it glides over the cam surface 27. To secure in these wings 38 greater efficiency without giving to them too great a length for the cam grooves, the ends of the wings on opposite sides have been cut away to form recesses 40 for receiving or meshing with the projecting ends of the wings of the next adjacent cam slide. The under-surface of each cam slide is curved and has a radius of curvature equal to that of the cam surface 27 over which it glides, the curve of the upper faces of the wings 38 being the same as that of the outer face of the grooves 29 and 30. I preferably provide the under face of each cam slide with a cavity or chamber 26' the area of which is substantially equal to that of the face of the piston attached to the slide. These chambers 26' perform an important function, as will more clearly appear later, in enabling oil pressure to be exerted on the rear of the cam slide when the latter glides on and off the cam surface 27 in avoiding strains to parts of the compressor and in reducing friction.

It is important in the construction of the cam slide and piston that the surfaces of these two members which are to be affected by pressures normal to the surfaces of the cam shields 6 and 27 be of substantially equal areas in order that the resultant of such pressures be reduced to a minimum and yet be able to exert a retaining influence sufficient to hold the cam slide to its place as it glides over the cam arm surface 27. When the two members 22, 23 are thus constructed, the face of piston 22 will have an area substantially equal to that of the under-side of the cam body 23 and the effect of pressures on the opposing faces of members 22, 23 will be practically neutralized.

Referring to Figs. 1, 2 and 3, I have shown in Fig. 3 means for steadying the pistons in their reciprocation, such as pins 41 passing through the drum and entering guide grooves 42 in the cam arm, one at each end. Such pins may, however, be omitted. To balance the reservoir pressure on the drum to prevent peripheral thrusts of the drum shaft against its bearings, I have provided pressure-shielding means such as a pressure shield 6 snugly fitting over the drum and shielding it from such pressure except at points exposed through slots 10, 11 and 12. The pressures at these points of the drum are, however, balanced because the combined area of the slots 11 and 12 is made equal to that of the air, gas or fluid delivery slot 10, and because further of the fact that the combined areas of passages 13 equal the sum of the areas of the openings of the piston channels 15, 16, 17 and 18, the reservoir pressures normal to the cylindrical surface of the drum are completely balanced inside and outside of the same. The pressures on opposite sides of the end wall of piston drum 7 are obviously balanced except for a crescent-shaped area about the hub 43. This area is the difference between that of the end of the hub 43 and that of the end of the cap 31 on the end of the cam arm 28. The center or axis of the cam arm 28 being eccentric to that of the hub 43, this difference in area is in form of a crescent 44, Fig. 4. The resulting reservoir pressure on such area would tend to force the drum to the left against the end of cap 31 on cam arm 28. This crescent piece is preferably made a part of the end wall of the casing, though it may be made separable and secured thereto in any suitable manner, but must be of the area above indicated. As thus arranged, the reservoir pressures on the drum are completely balanced, thereby greatly reducing friction and wear at the shaft bearings, and avoiding the use of means for balancing pressures on the shaft bearings. In my application Serial No. 309,001, filed March 20, 1906, I have shown and described various forms of pressure shields for the purpose named, and have broadly claimed the same therein.

For the purpose of assembling the several parts of the pump, reference is had to Fig. 5. The cam slides 23 with the pistons 19 and 22 removed are arranged around the cam shield 27 with the cam wings 38 resting in the recess or groove 30 in the cam arm 28. The cap 31 is then secured on the end of cam arm 28 to retain the cam plates in place. The drum 7 is keyed to its shaft 8 and then shoved into the shield 6. The end plate 9 carrying the cam arm and cam slides is now made fast to the end of the pump casing, taking care that the center of the cam and that of the shaft lie in a horizontal line. The pistons are next introduced into their piston channels through slot 10 and secured to the rockers 34 on the cam slides after which the dome of the casing is bolted down, when the pump will have the external appearance as shown in Fig. 6. In event it is desired to construct the dome integral with the casing, then a manhole may be provided in the dome.

The operation of the pump as thus far described is as follows: Assume that the pistons have taken the position shown in Figs. 1 and 2, and that a liquid such as oil fills the interior spaces of the drum 7 and rises in the casing high enough to cover the piston channel openings of the same. Power is now applied to the shaft 8 through any suitable means to rotate the piston drum in the direction indicated by the arrow, Fig. 2. The outer end of piston channel 18 is cut off from communicating with the space containing oil under reservoir pressure. Piston 19 is moving inward on the radius of the drum 7 and begins to take in air through valved passage 19'. The reservoir pressure is tending to force the cam slide 26 inward against the face of cam 27 while a pressure substantially equal to and opposite in direction is tending to force the piston outward. The two tendencies are therefore equalized in the position of the piston and cam slide at the moment of beginning and ending of the intake stroke. The reservoir pressure has no access to the rear of the cam slide, as the under surface of the latter is shielded from such pressure by means of the shielding action of the cam face 27. The pressure on the rear of the piston has thus been practically removed, leaving atmospheric pressure on the face of the piston on the air intake side of the drum as this piston is carried down and around to the delivery side. It will be observed, however, that as the piston 19 approaches a point about ninety degrees away from its first point, the pressure on the cam slide does not quite diametrically oppose that on the piston, and for this reason it is preferable to make the surface of the cam slide which is exposed to reservoir pressure slightly larger than that of the piston face opposing it to thereby assure a slight overbalancing pressure of the cam slide against the face of the cam. Although I have shown cam wings on the cam slides and prefer to employ the same, yet in some constructions of the compressor it is evident that they may be omitted, and reliance placed on a slight predominating pressure, as above explained, to hold the slides against the cam face 27. On the arrival of the piston 19 at the end of its intake stroke where it takes the position of piston 21, with its piston channel 16, the latter is about to deliver its charge of air into the space within the casing through slot 10. At this moment the cam slide is about to move off the cam face 27. The discharge of the air from the piston channel is effected at the next advance of the drum and without any appreciable compression within the channel itself, because the discharge end of the channel opens without the interposition of any restricted passage-way directly and almost instantly into the space within the casing. All local heating of the piston drum is therefore avoided. To thus introduce the contents of the piston channel into the reservoir without compression in the channel is an important feature of my invention, as it enables the air in the piston channel on the delivery side of the pump to be transferred and absorbed into a large volume of air at a higher pressure without appreciably heating the walls of the piston channels or passages. Furthermore, as the inward moving pistons on the air intake side displace the oil in the reservoir to make room for the charge of air in the piston channel, there is a momentary compressing of the air in the air space above the oil. The resulting heat of compression is distributed through an extended space and is dissipated practically as fast as produced, thereby effecting compression at the uniform temperature of the incoming air, thereby saving power and avoiding lost work. At the moment the piston channel 16 delivers its contents of air through slot 10, the cam slide moves over the edge of the cam face 27, thereby exposing the previously protected back or rear of the slide to reservoir pressure. The piston with its cam slide is now guided through the oil without expenditure of energy except that necessary to overcome friction to the point of starting to again repeat its cycle of operations.

When the forward portion of the cam slide begins to span or lap over the cam face 27 in its advance to the air intake side of the compressor, the chamber 26' in the under-side of the body portion of the cam-slide communicates freely with the oil space of the drum, thereby enabling reservoir pressure to be applied to the underside of the cam-slide and over an area substantially equaling the cross-section of the piston attached to the slide. Pressures on the outer and inner faces of the cam-slide are, therefore, in large measure balanced up to the moment when the rear edge of the slide passes onto the cam face 27, and the piston face and back of the cam slide are cut off from reservoir pressure, thereby enabling an easy seating of the advancing slide on the cam face without friction, jar or strain on any part of the drum. A similar function is performed by the chamber 26' when the cam slide passes off the cam face on the opposite side of the drum.

It is sometimes desirable, as in the case of rapid air compression to provide cooling means for the compressed gas, and to this end I have illustrated in Fig. 9 a reservoir 45 provided with a fluted bottom for giving a greater cooling surface to be secured on top of the pump casing, serving also as a dome for the compressor. A constant circulation of the cooling medium may be maintained through the inlet and outlet pipes 46 and 47.

In order to further reduce friction of the cam slides, I may provide the same with anti-friction bearings such as rollers 48, shown in Fig. 11. I do not confine myself, however, to rollers for this purpose, as ball bearings may be used with equal advantage.

In Figs. 15 and 16, I have shown the oil receiving cavity in the cam slide as being provided with means for automatic enlargement. This means may be used when it is desired to overcome the expansive force of gases absorbed in the oil. After the cam slide passes onto the cam face 27, a small volume of oil previously under reservoir pressure is confined within the chamber 26'. This oil especially when high pressures are reached may contain absorbed or dissolved gases which will expand and exert an outward pressure on the underside of the cam-slide and have a tendency to unbalance the pressures thereon. The oil itself being practically uncompressible will exert no such unbalancing effect. To overcome this pressure of the expanding gases, I have provided compensating means, as shown in Figs. 15 and 16, in which an expansion chamber 49 communicates with the cam space 26' and contains a reciprocating plunger 50. This plunger is provided with resilient means such as a spring 51 arranged to normally retain the plunger in its chamber 49, while offering only slight resistance to a force tending to thrust it outward. In the face of one of the guide grooves in the cam arm 28 is made a small groove 51. This groove extends along and follows the curve of the cam face 27 on the atmosphere side of the drum. When the cam slide reaches the position of cam 26 (Fig. 2) the plunger 50 would be opposite the entrance end of groove 51. The confined gas in space 26' of the cam slide 26 would force the plunger 50 outward and the pressure would be relieved.

Although I have described above the pistons as being reciprocated by their attachment to the cam slide lone, yet I may employ in connection with the latter piston bars and secure the advantages of this invention. In Figs. 12 and 13, I have shown cam bars 52 in connection with the cam slides. Each bar is provided with the usual cam rollers 53 which run in grooves 54 concentric with the axis of the cam arm 28. Slots 55 are provided in the end of the drum for the reciprocation of the bars in lines radially of the drum. The remaining features of construction are those previously described in relation with Figs. 1 and 2. When the steadying pins 41 are employed, each pin is provided with a slot for receiving the cam bar 52. This slot is shown in the pin illustrated in Fig. 3.

The principle of this invention may also be applied in the construction of a plurality of piston drums. In Fig. 14 I have illustrated a pump having double piston drums. The drum 7' is preferably made in a single piece by casting, though it may be made in two parts and the parts secured together. The open ends of the drums face the end walls of the casing and their closed ends are connected to each other and secured fast to the power shaft 8. In other respects the construction and operation of the pump are the same as previously described. Such a pump has the advantage of rapid compression, and at the same time can be run without any substantial increase in heating.

What I claim is:

1. In a pump, the combination of a reciprocating piston having one face exposed to reservoir pressure during its double stroke, a stationary surface and a sliding member adapted to be held against said surface by reservoir pressure while the piston is taking in a charge of fluid, said member engaging said piston and applying thereto reservoir pressure in opposition to said pressure.

2. In a pump, the combination of a revoluble piston carrying drum, a piston therein, means for reciprocating said piston, and means subject to pump delivery pressure for counteracting the force of said pressure on one face of the piston while the piston is taking in a charge of fluid.

3. In an air and gas pump, the combination of a revoluble piston carrying drum, a piston therein, means for reciprocating said piston, means for counteracting the pump delivery pressure on one face of the piston while the piston is taking in a charge of fluid, and a pressure shield within which said drum revolves and which relieves said pressure on said drum.

4. In a pump, the combination of a casing, a revoluble drum therein provided with a piston channel having a full width opening through its walls into the casing, a cam-operated piston in said channel, and means for balancing the pump delivery pressure on one face of said piston while the piston is taking in a charge of fluid.

5. In a pump, the combination of a casing having an inlet and outlet, a revoluble drum therein having piston channels opening through the walls of said drum, cam operated pistons in said channels, a cylindrical pressure shield for said drum having on one side a slot registering with said piston channels and on the opposite side one or more slots having a total area equal that of the first-mentioned slot and out of registry with said piston channels.

6. In a pump, the combination of a reciprocating piston, means for operating the same and means subject to previously stored up reservoir pressure operative during one stroke of the piston for relieving reservoir pressure on the piston.

7. In a pump, the combination with a casing having an inlet and outlet, a revoluble drum therein having piston channels opening through the walls of said drum, cam-operated pistons in said channels, a cylindrical pressure shield for said drum having on one side a slot registering with said piston channels and on the opposite side one or more slots having a total area equal that of the first-mentioned slot and out of registry with said piston channels, and a plurality of openings in said drum circumferentially arranged to register with said slots the combined cross-sectional area equaling that of the piston channels.

8. In a pump, the combination of a casing having an inlet and outlet, a revoluble drum in open communication with said casing, piston channels opening through the walls of said drum, pistons in said channels, a cylindrical pressure shield for said drum having a slot registering with said piston channels, a cam shield within said drum and cam slides subject to the delivery pressure of the pump and pivotally connected with said pistons.

9. In a pump, the combination of a casing having an inlet and outlet, a revoluble drum in open communication with said casing, a cylindrical pressure shield intermediate said casing and drum, said drum having piston channels open successively to said inlet and outlet, pistons in said channels provided with cam slides subject to pressure within the casing and pivotally connected with said pistons, and a cam shield in said drum in operative relation with said slides.

10. In a pump, the combination of a casing having an inlet and outlet, a revoluble drum therein having piston channels successively open to said inlet and outlet, pistons in said channels, cam slides subject to the delivery pressure of the pump and pivotally connected to said pistons, and a cam shield in operative relation with said slides.

11. In a pump, the combination of a casing, a piston carrying drum mounted on a shaft having bearings in the end walls of said casing, a cam arm fast to one of said end walls and having a segmental cam shield, cam slides pivotally connected to said pistons and engaging said cam shields on the intake stroke of said pistons and passing off said shield on the delivery stroke of the pistons.

12. In a pump, the combination of a casing having an inlet and outlet, a drum revolubly mounted therein in open communication with said casing and having piston channels successively open to said inlet and outlet, pistons in said channels having their rear faces exposed to fluid pressure within the casing during a complete revolution of the drum, means for reciprocating said pistons and means for counteracting said pressure on said faces during the intake stroke of said pistons.

13. In a pump, the combination of a casing, a drum mounted to rotate therein a piston in said drum one face of said piston being exposed to reservoir pressure during both strokes of the piston and the opposite face being exposed to said pressure during the delivery stroke only, a cam arm extending into said drum having a pressure shield thereon, a cam operated slide pivotally connected to said piston and movably held against said pressure shield during the working stroke of said piston.

14. In a pump, the combination of a casing having an inlet and outlet, a revoluble drum in said casing having a piston channel and a piston in said channel, a cam arm extending into one end of said drum and having a circular channel therein eccentric to the drum axis, a cam slide having side flanges engaging said channel and pivotally connected to said piston, said slide being movably held against the bottom of said channel by reservoir pressure during the working stroke of said piston.

15. In a pump, the combination of a casing having an inlet and outlet, a revoluble drum in said casing having a piston channel and a cam-operated piston therein, a pressure shield eccentrically located within said drum, a cam slide pivotally connected to said piston and movably held against said shield by reservoir pressure within said casing during the working stroke of said piston.

16. In a pump, the combination of a casing having an inlet and outlet, a piston carrying drum mounted to rotate therein, a cam arm provided with cam grooves and a pressure shield between them located eccentrically of said drum, a cam slide engaging said grooves pivotally connected to said piston and engaging said grooves and movably held against said shield during the working stroke of said piston.

17. In a pump, the combination of a casing having an inlet and outlet, a revoluble drum having a piston channel opening through the walls of the drum into the space within the casing, a piston in said channel having its inner face exposed to reservoir pressure within the casing during its intake and delivery stroke and having both its faces exposed to said reservoir pressure on its delivery stroke, and means within the drum subject to reservoir pressure for applying a force to the piston to oppose reservoir pressure on said piston during its intake stroke.

18. In a pump, the combination of a casing having an inlet and outlet, a revoluble drum in said casing having a piston channel and a cam operated piston therein, said channel opening into said casing during the delivery stroke of the piston, a closure for one end of said channel during the intake stroke of the piston, one face of said piston being exposed to reservoir pressure within the casing during both strokes of the piston, a pressure shield, a cam slide having a pivotal connection with said piston movably held against said shield by said reservoir pressure during the intake stroke of the piston.

19. In a pump, a casing, a drum revoluble within the casing and having a piston channel and a piston therein, one end of said channel being alternately open to and cut off from communication with the casing space as the drum revolves, a segmental cam surface eccentric to the axis of the drum, and a cam slide movable over said surface and having a pivotal connection with said piston, the bearing surface of said slide having a depression for applying fluid under pressure to the slide as it moves onto and leaves the cam surface.

20. In a pump, the combination of a cam slide having a fluid-receiving depression in its bearing surface and provided with a pivotal connection for a piston, and a discontinuous cam surface against which the slide is held by fluid pressure.

21. In a pump or fluid motor, the combination of a cam slide having a fluid receiving depression in its bearing surface, and a piston pivotally connected thereto.

22. In a pump or fluid motor, the combination of a cam slide having a fluid-receiving depression in its bearing surface, guide flanges and roller bearings on said flanges.

23. In a pump or fluid motor, the combination of a cam slide having a fluid-receiving depression in its bearing surface, guide flanges at its sides, and a piston pivotally connected to said slide.

24. In a pump or fluid motor a cam slide having a fluid-retaining depression in its bearing surface.

25. In a pump or fluid motor, the combination of a cam slide having a fluid-receiving depression in its bearing surface, and a yielding pressure relief device in connection therewith.

26. In a pump, the combination of a casing having an inlet and outlet, a drum having piston channels through its walls, and cam-operated pistons in said channels, pressure shields one within and one surrounding said drum, the latter having an opening registering with said piston channels on the delivery stroke of the pistons and other openings for admitting fluid to the interior of the drum, and cam slides pivotally connected to said pistons and held against said inner shield by fluid pressure within the casing during the working stroke of said piston.

27. In a pump, the combination of a drum provided with a piston channel opening through the walls of the drum, a cam-operated piston in said channel one face of said piston being continually exposed to the delivery pressure of said pump, and means associated with said piston subject to said delivery pressure for opposing the pressure on said piston during its intake and delivery stroke.

28. In a pump, the combination of a reciprocating piston having one face exposed to reservoir pressure during its double stroke and having both faces subject to reservoir pressure during its delivery stroke, a stationary surface and a sliding member adapted to be held against said surface by reservoir pressure while the piston is taking in a charge of fluid, said member engaging said piston and applying thereto reservoir pressure in opposition to said pressure.

29. In a pump, the combination of a casing, a revoluble drum therein provided with an end wall and having radial piston channels, pistons in said channels provided with cam slides, a stationary cam arm extending within the drum and abutting said end wall, said arm having cam grooves and a segmental cam pressure shield for engaging said slides and reciprocating said pistons, a perforated pressure shield engaging the periphery of said drum, and a stationary crescent shaped pressure shield for relieving fluid pressure on the end wall of the said drum.

30. In a pump, the combination of a revoluble drum having radial piston channels, pistons in said channels, cam operated bars engaging said pistons to reciprocate the same in the piston channels, and pins carried by said drum and engaging said bars for steadying or restraining the pistons in their movement.

31. In a pump, the combination of a casing, a revoluble drum therein provided with a piston channel having a wide opening through its walls into the casing, a cam-operated piston in said channel, and means back of the piston for cushioning or offsetting the impact of the reservoir pressure that is suddenly exerted on the face of the piston at the commencement of the compression stroke.

In testimony whereof I have signed this specification in the presence of two subscribing witnesses.

LEBBEUS H. ROGERS.

Witnesses:
A. P. ESPIE,
CHARLES LEAVAY.